US011934420B2

(12) United States Patent
Smith et al.

(10) Patent No.: US 11,934,420 B2
(45) Date of Patent: Mar. 19, 2024

(54) SYSTEMS AND METHODS FOR COMPONENTIZATION AND PLUG AND PLAY WORKFLOWS

(71) Applicant: Walmart Apollo, LLC, Bentonville, AR (US)

(72) Inventors: Uma Maheswari Rethina Smith, Belmont, CA (US); Shubra Shetty, Milpitas, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 241 days.

(21) Appl. No.: 17/162,192

(22) Filed: Jan. 29, 2021

(65) Prior Publication Data
US 2022/0245164 A1 Aug. 4, 2022

(51) Int. Cl.
*G06F 16/00* (2019.01)
*G06F 9/54* (2006.01)
*G06F 16/21* (2019.01)
*G06F 16/242* (2019.01)
*G06F 16/25* (2019.01)

(52) U.S. Cl.
CPC ............ *G06F 16/252* (2019.01); *G06F 9/541* (2013.01); *G06F 16/211* (2019.01); *G06F 16/2423* (2019.01)

(58) Field of Classification Search
CPC ...... G06F 16/252; G06F 9/541; G06F 16/211; G06F 16/2423
See application file for complete search history.

(56) References Cited

U.S. PATENT DOCUMENTS

| | | | |
|---|---|---|---|
| 7,240,323 B1 | 7/2007 | Desai et al. | |
| 7,290,249 B2 | 10/2007 | Sengodan | |
| 2002/0069399 A1* | 6/2002 | Miloushey | G06F 9/4812 717/108 |
| 2002/0069400 A1 | 6/2002 | Miloushev et al. | |
| 2006/0173985 A1* | 8/2006 | Moore | H04L 67/00 707/E17.116 |
| 2009/0319958 A1 | 12/2009 | Li et al. | |

(Continued)

OTHER PUBLICATIONS

Bahreini et al., Efficient Placement of Multi-Component Application Edge Computing Systems, SEC '17: Proceedings of the Second ACM/IEEE Symposium on Edge Computing, Oct. 2017, Article No. 5, pp. 1-11, retrieved Nov. 18, 2022, retrieved from the Internet <URL: https://dl.acm.org/doi/10.1 (Year: 2017).*

(Continued)

*Primary Examiner* — Tyler J Torgrimson
(74) *Attorney, Agent, or Firm* — Morgan, Lewis & Bockius LLP; Manita Rawat

(57) ABSTRACT

Systems and methods for generating and implementing reusable interface components is disclosed. A schema is loaded from a repository. The schema defines one or more containers configured to receive a component therein. At least one component is selected for insertion into a first container defined by the schema. The at least one component includes a frontend portion and a backend portion. The fronted portion defines at least one customization of the component. The at least one customization of the at least one component is defined and the at least one component is implemented using a predetermined decoding process.

20 Claims, 5 Drawing Sheets

(56) References Cited

U.S. PATENT DOCUMENTS

2019/0324729 A1* 10/2019 Badapanda ............... G06F 8/36

OTHER PUBLICATIONS

W3, Style Sheets, Archived on Jan. 1, 2014, retrieved on Nov. 18, 2022, retrieved from the Internet <URL: https://web.archive.org/web/20140101010429/https://www.w3.org/TR/html401/present/styles.html> (Year: 2014).*
Rene Rubalcava, Using React with the ArcGIS API for JavaScript, published Dec. 4, 2018, retrieved on Nov. 18, 2022, retrieved from the Internet <URL: https://www.esri.com/arcgis-blog/products/js-api-arcgis/mapping/using-react-with-the-arcgis-api-for-javascript/#:~:text=React%20i (Year: 2018).*
Lednicki, "Component-Based Development for Software and Hardware Components", 2008, p. 1-51.
Wang et al., "Plug-and-Play Architectural Design and Verification", 2008, p. 273-297.
Hansen et al., "Plug-and-Play for Creating "Instant" GN&C Solutions", 2007, p. 1-7.

* cited by examiner

SYSTEMS AND METHODS FOR COMPONENTIZATION AND PLUG AND PLAY WORKFLOWS

TECHNICAL FIELD

This application relates generally to software model generation and, more particularly, to software model generation using componentized elements.

BACKGROUND

Current systems rely on large installed bases of various programming languages, libraries, and packages. Managing current installed systems requires those interacting with the systems to have a large knowledge base reflecting all of the currently and/or previously installed components on the systems. The large installed bases makes it difficult for users to learn systems when switching aspects, for example, moving from back-end elements to front-end elements.

Due to the large installed bases of code, current systems result in large amounts of duplication. A developer seeking to implement one or more functionalities in one portion of the code base may be not be aware that similar or identical functionality has been previously implemented by other developers working in other portions of the code base. Such duplication results in inconsistent code (where different approaches to the same functionality are taken), duplication of work, and inefficient allocation of resources.

SUMMARY

In various embodiments, a system is disclosed. The system includes a non-transitory memory having instructions stored thereon and a processor configured to read the instructions. The processor is configured to load a schema from a repository and select at least one component for insertion into a first container defined by the schema. The schema defines one or more containers configured to receive a component therein and the at least one component includes a frontend portion and a backend portion. The fronted portion is configured to receive at least one customization of the at least one component. The at least one customization of the at least one component is defined and the at least one component is implemented using a predetermined decoding process.

In various embodiments, a non-transitory computer readable medium having instructions stored thereon is disclosed. The instructions, when executed by a processor cause a device to perform operations including loading a schema from a repository and selecting at least one component for insertion into a first container defined by the schema. The schema defines one or more containers configured to receive a component therein and the at least one component includes a frontend portion and a backend portion. The fronted portion is configured to receive at least one customization of the at least one component. The processor further causes the device to perform operations including defining the at least one customization of the at least one component implementing the at least one component using a predetermined decoding process.

In various embodiments, a computer-implemented method is disclosed. The computer-implemented method includes the steps of loading a schema from a repository and selecting at least one component for insertion into a first container defined by the schema. The schema defines one or more containers configured to receive a component therein and the at least one component includes a frontend portion and a backend portion. The fronted portion is configured to receive at least one customization of the at least one component. The method further includes the steps of defining the at least one customization of the at least one component implementing the at least one component using a predetermined decoding process.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
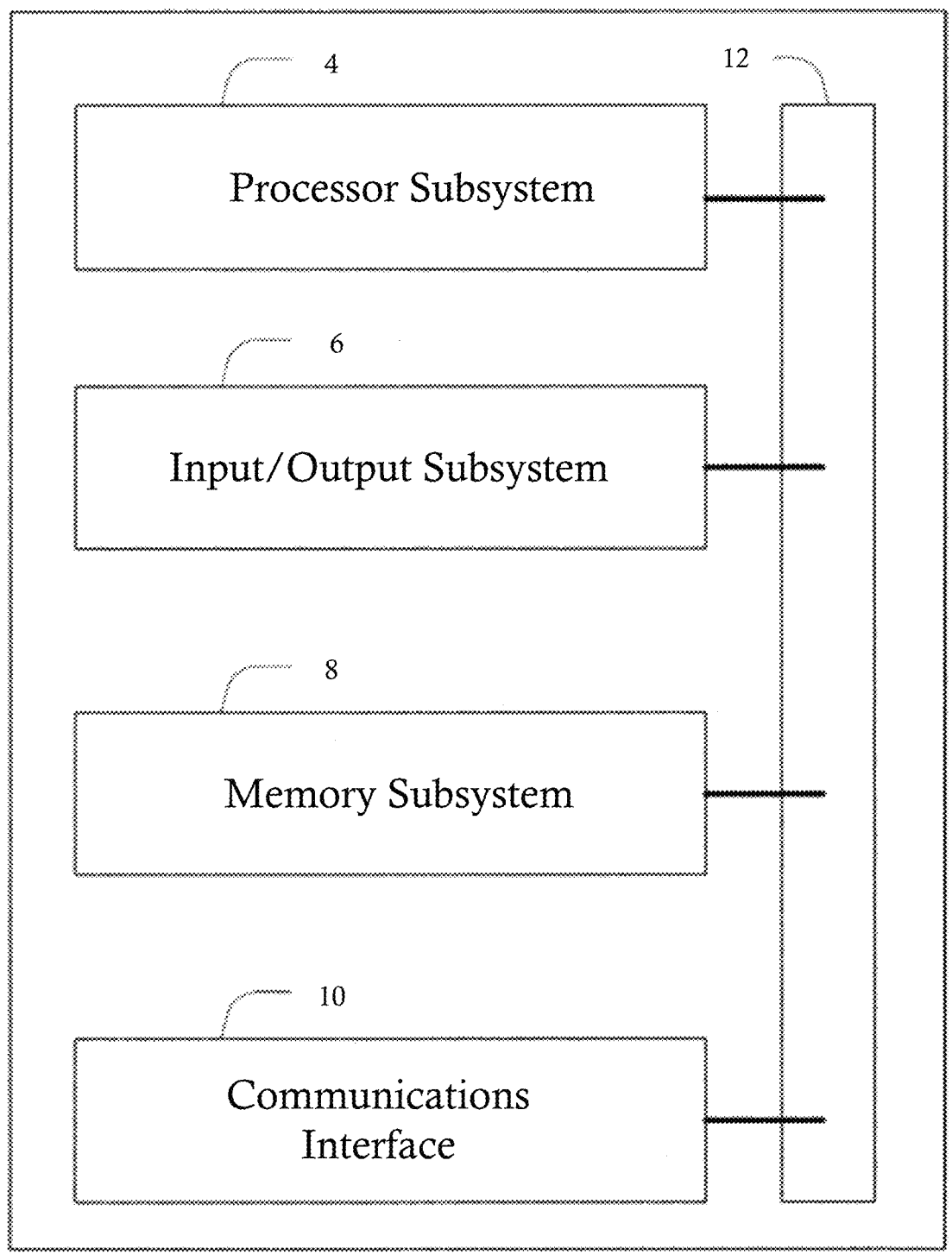
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In various embodiments, systems and methods of componentization of workflows is disclosed. Various workflows, e.g., code elements, packages, applications, applets, etc., are broken into reusable, identifiable components that may be reused across various workflows and projects. The individual components are stored in a shared component library and are referenced by one or more component wrappers. For example, in various embodiments, a component may include a front end JSON configured to provide input to an underlying code based configured to implement functionality of the component. The componentization of various workflows provides for abstraction of complexity, reusability, time savings, and monetary savings when generating new projects or workflows. As used herein, the term componentization refers to the generation of identifiable code sections that may be written and deployed across a wide diversity of projects, applications, languages, and/or environments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
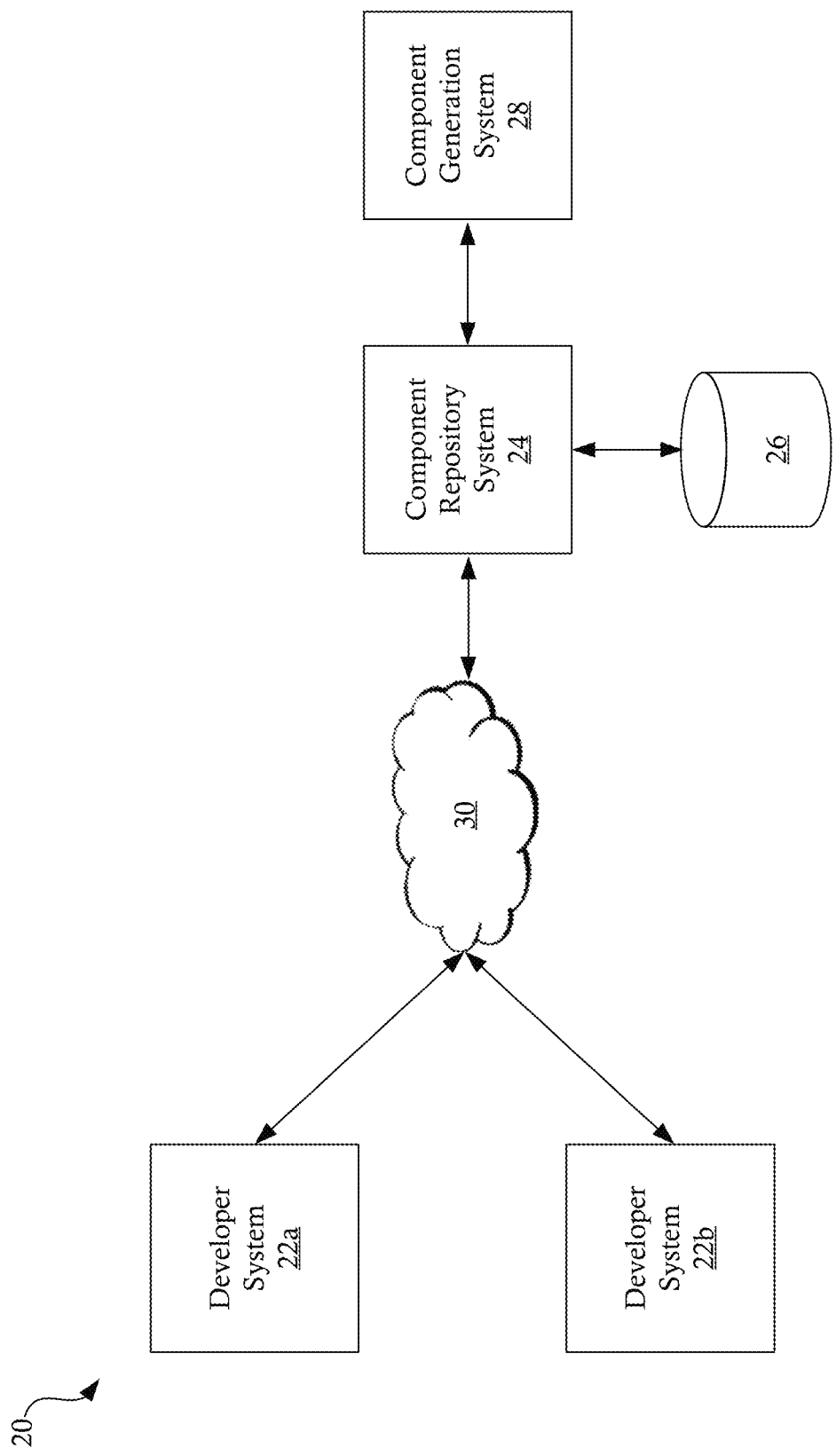
FIG. 2 illustrates a network environment configured to perform componentization and modular generation of software modules, in accordance with some embodiments.

FIG. 2 illustrates a network environment 20 configured to perform componentization and modular generation of software modules, in accordance with some embodiments. The network environment 20 may include, but is not limited to, one or more developer systems 22a-22b, one or more component repository systems 24, one or more component generation system 26, one or more component databases 28, and/or any other suitable system. Each of the systems 22a-26 and/or the databases 28 may include a system as described above with respect to FIG. 1. Although embodiments are illustrates herein having discrete systems, it will be appreciated that one or more of the illustrated systems may be combined into a single system configured to implement the functionality and/or services of each of the combined systems. For example, although embodiments are illustrated and discussed herein including each of a developer system 22a-22b, a component repository system 24, a component generation system, and/or a component database 28, it will be appreciated that these systems may be combined into a single logical and/or physical system configured to perform the functions and/or provide services associated with each of the individual systems. It will also be appreciated that each of the illustrated systems may be replicated and/or split into multiple systems configured to perform similar functions and/or parts of a function.

In various embodiments, the developer systems 22a-22b are configured to provide users access to a component library for generation of one or more back-end and/or front-end projects. As used herein, the term project may refer to any suitable computer-implemented program, application, applet, and/or other computer-executable code configured to provide one or more predetermined functionalities. For example, in some cases, the component library may be configured to provide one or more components used in the generation of front-end webpages and/or web-based applications. Although embodiments are discussed herein including front-end projects, it will be appreciated that the componentization methods disclosed herein may be applied to any suitable code base having one or more reusable modules.

In one embodiment, the developer system 22a-22b may be configured to provide a project template and one or more components configured to be inserted into the project template. For example, the developer system 22a-22b may be configured to present a webpage or web-app template including multiple containers configured to receive one or more of the components. A user may select a component to be inserted into a container on the template. After inserting the component, a user may customize the component based on the specific use and/or project being developed. For example, using existing systems, insertion of a table component may take up to 150 lines of code that must be generated by the developer each time a table component is required. Using the componentization methods disclosed herein, the required customization may be reduced to less than on tenth (e.g., less than 15 lines of code) that are required to insert and configure the table component. It will be appreciated that such reduction in code requirement allows for a greater number of individuals to be proficient in generating projects given the reduced knowledge and time burdens.

In some embodiments, and as discussed in greater detail below, the one or more components useable by the developer system 22a-22b may be stored on and/or accessed through a component repository system 24. The component repository system 24 is configured to maintain and provide a listing of the set of components available for each project. In some embodiments, the component repository system 24 is configured to link each implementation of a component to the associated back-end information source associated with the component. For example, to continue the table component example, if a user selects a table component for insertion into a project, the component repository system 24 may be configured to provide linking (e.g., data communication) between the developer system 22a-22b and one or more back-end resources to provide the necessary data for generation of the table (as identified by the configuration of the component by the user).

In some embodiments, the component repository system 24 is in communication with and/or integrally formed with a component database 28 configured to store each of the deployable components. For example, in some embodiments, after a component is generated according to the methods described herein, the component (i.e., the code of the component itself and/or accessory code for deploying/using the component) may be stored in the component database 28 for ease of access. In some instances, deploying a component to a project may copy at least a portion of the code from the component database 28 into one or more files of the project. In other instances, deploying a component may simply provide a pointer to the code in the component database 28 (and/or some other repository) that allows the code to be retrieved/executed as needed (e.g., during testing, at runtime, etc.). It will be appreciated that although specific embodiments are disclosed herein, the disclosed componentization methods may be applied within any suitable storage and/or network architecture.

In some embodiments, a component generation system 26 is configured to generate one or more componentized models (e.g., one or more components) for deployment to one or more projects. For example, in some embodiments, the component generation system 26 is configured to allow generation of "plug and play" model workflows that facilitate rapid integration into projects by abstracting complexity and providing reusable componentized modules. The components generated by the component generation system 26 allow for the use of project templates that allow for the deployment of one or more of the generated components. The use of components prevents duplication of work and allows developers to learn a single product (i.e., a single component) that may be reused and redeployed across multiple projects with minimal or no modification. Componentization also provides for standardization of testing frameworks, code management, application maintenance, and other common development tasks, allowing for rapid development of new projects based on existing components.

Figure 3:
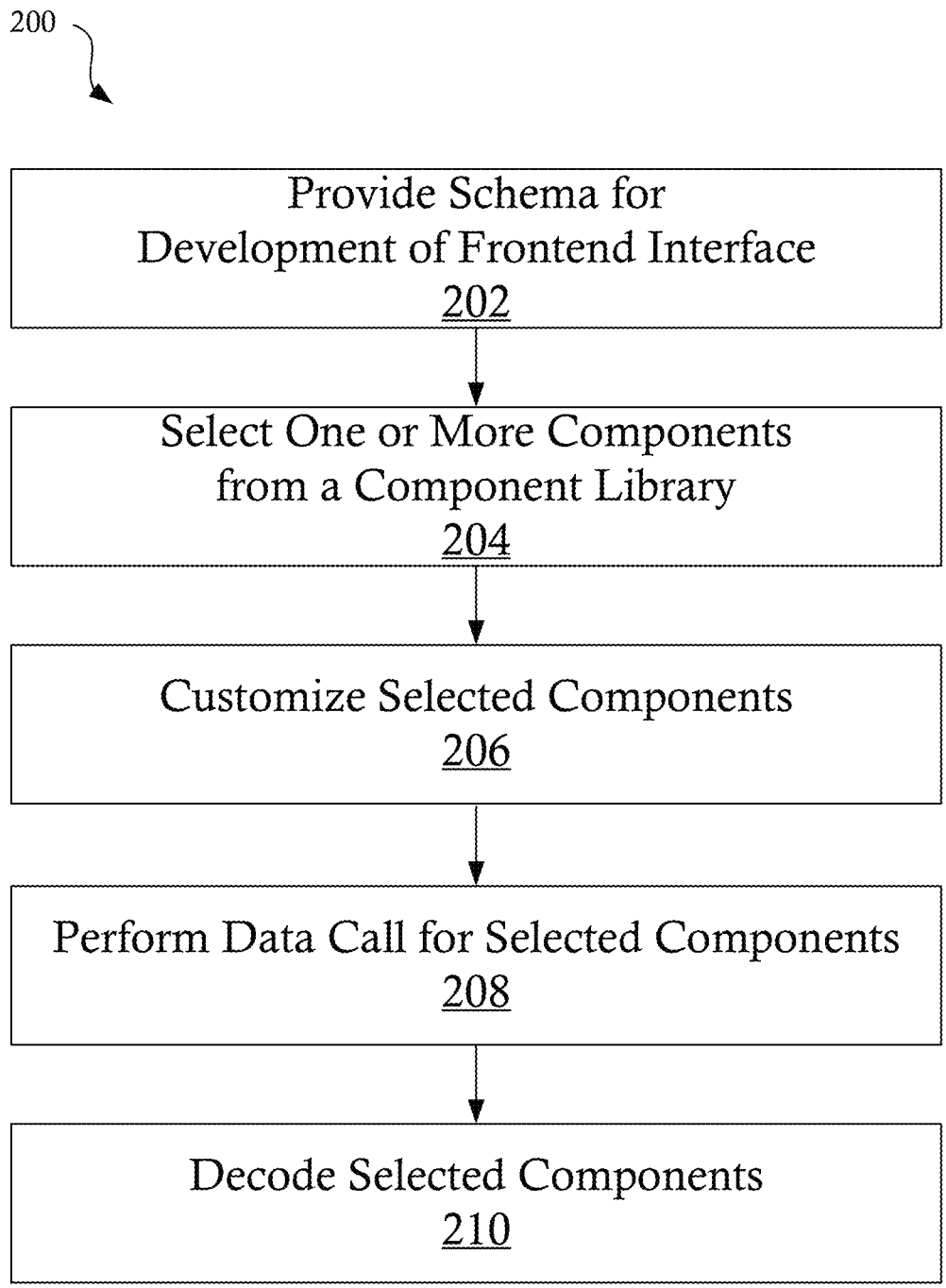
FIG. 3 is a flowchart illustrating a method of generating a project using a plurality of componentized modules, in accordance with some embodiments.
Figure 4:
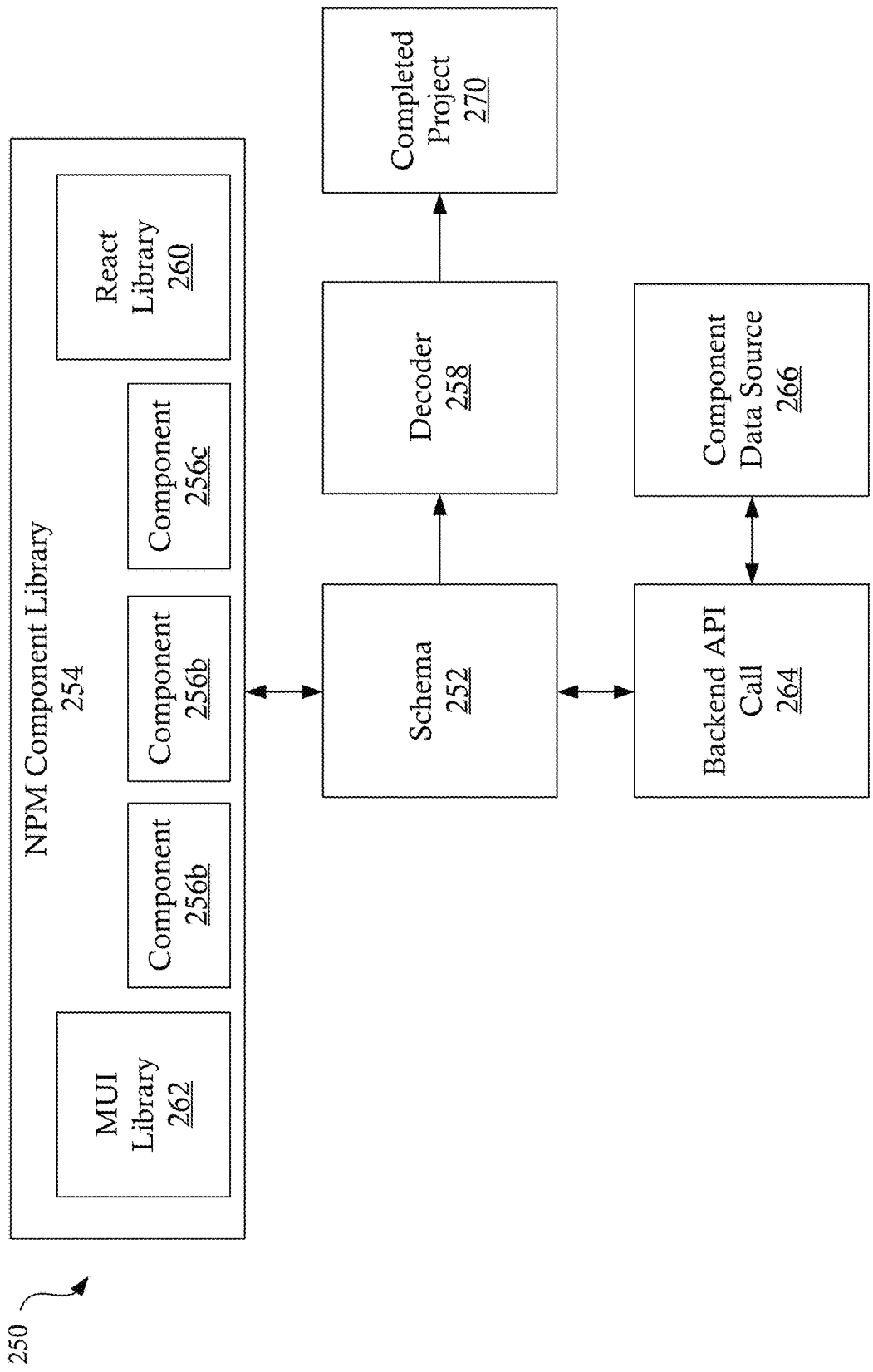
FIG. 4 is a process flow illustrating various steps of the method of FIG. 3, in accordance with some embodiments.

FIG. 3 is a flowchart illustrating a method 200 of generating a project using a plurality of componentized modules, in accordance with some embodiments. FIG. 4 is a process flow 250 illustrating various steps of the method 200 of FIG. 3, in accordance with some embodiments. At step 202, a schema (or template) 252 is provided for development of a frontend interface. The schema 252 may be selected based on the type of application being developed. For example, in some embodiments, the schema 252 may include a website template configured to provide multiple containers in a predetermined configuration. Each of the containers may be configured to allow deployment of one or more components, as discussed below. In other embodiments, the schema 252 may be a code schema including one or more code sections configured to allow deployment of one or more components. Although specific embodiments are discussed herein, it will be appreciated that the method 200 may be implemented using any suitable schema and/or implemented without a schema, in accordance with various embodiments.

In some embodiments, the schema 252 includes one or more predetermined computer language(s) for deployment of components. For example, components may be generated in and/or referenced by code segments generated in a predetermined language, such as JSON, YML, XML, HTML, and/or any other suitable code section. The schema 252 may be written in the same and/or a complimentary language as the components such that the schema 252 is able to integrate the components into the schema 252. As one non-limiting example, in some embodiments, the components are generated as JSON files and the schema 252 includes a JSON schema for webpages configured to integrate the JSON components therein. It will be appreciated that the schema 252 and one or more components may be written in the same and/or different languages.

In some embodiments, the schema 252 defines one or more themes for a project (e.g., webpage, application, etc.) built from the schema 252. The theme may include, but is not limited to, look-and-feel elements of the project such as the appearance of simple, shared elements such as buttons, text fields, drop-downs, etc. As discussed in greater detail below, the theme elements may be injected into components inserted into the page from a component library, as discussed in greater detail below. The theme may be inserted (or stitched) into the various selected components at build time and/or at run time.

In some embodiments, the schema 252 may include functionality configured to detect themes and/or theming elements from one or more existing projects, pages, etc. For example, in some embodiments, the schema 252 may be configured to be inserted into an existing project or website. The schema 252 is configured to query one or more of the existing pages, applications, etc. within the project or website to determine applicable themes and/or theming elements. In some embodiments, a user may identify a specific theme source and the schema 252 may load theme elements from the specified theme source.

In some embodiments, a schema 252 includes one or more testing elements, such as testing protocols, systems, functions, code blocks, etc. The testing elements may include, but are not limited to, unit testing and integration testing. In some embodiments, the testing elements are executed during building of the applicable project/webpage. In other embodiments, testing elements are executed at user request and/or during a testing phase of project deployment.

At step 204, one or more components 256a-256c are selected from a component library 254. The component library 254 may be stored on and/or provided by any suitable system, such as, for example, the component repository system 24, the component database 28, and/or any other suitable system. The component repository system 24 and/or the component database 28 may be locally located and/or remotely located (i.e., cloud resources) with respect to the developer system 22a, 22b. In some embodiments, the component library 254 may be configured to provide components 256a-256c stored across multiple system and/or provide a limited set of components 256a-256c stored in a component storage system. For example, in some embodiments, the component library 254 may be configured to provide specific components 256a-256c based on the schema 252 selected at step 202 such that the components 256a-256c included in the component library 254 are compatible with the schema 252 and/or the intended use of the schema 252. In other embodiments, the component library 254 may be a global library and component compatibility may be handled by the schema 252 and/or another suitable system or process, in accordance with various embodiments.

In some embodiments, the schema 252 and/or the components 256a-256c in the component library may be configured for one or more predetermined environments. For example, in various embodiments, the schema 252 and/or the components 256a-256c may be configured to provide user interface (UI) elements for one or more predetermined user interfaces, such as a website, application, applet, and/or other user interface system. In some embodiments, the schema 252 includes a template for the predetermined user interface, such as a website template for generating a website page for a web environment, and the components 256a-256c define web-based components configured to be inserted into various containers defined in the schema 252. Although specific embodiments are discussed herein including UI components and schemas, it will be appreciated that the disclosed systems and methods may be applied to any suitable predetermined environment.

In some embodiments, the component library 254 may be implemented as an edge-side streaming library, such as, for example, a Kuiper library, a MUI library, and/or any other suitable library. In such embodiments, the component library 254 includes a set of components 256a-256c that are preconfigured for deployment to a limited set of schemas. For example, in some embodiments, the set of schemas may include a set of predefined schemas used by an organization, a portion of an organization, a global standard, and/or any other suitable constrained set. The set of schemas includes containers that are configured to implement a subset of the components 256a-256c that are stored in the component library 254.

In some embodiments, the component library 254 may include additional elements, such as, for example, React library components 260 and/or MUI library components. Although specific embodiments are discussed herein, it will be appreciated that the component library 254 can include any suitable code elements configured to implement and/or build a user interface using the components 256a-256c stored in the component library 254.

In some embodiments, each component 256a-256c may include a front-end portion available to a developer, e.g., through a developer system 22a-22b, and a backend portion accessible through an application programming interface (API) defining the underlying shared code for the component 256a-256c. For example, in some embodiments, a table component may be inserted as JSON file including one or more fields (or input values) defining the type of component, for example, fields defining various display elements of the table, one or more fields identifying the component as a "table" element, and one or more fields defining a data source for the table. The one or more fields identifying the component determine the code that is loaded within the schema 252 based on a decoding protocol to map the identification, e.g., "table," to a set of predefined underlying code for implementing a table.

In some embodiments, a component 256a-256c may include a "custom component" configured to override one or more elements of the schema 252. For example, in some embodiments, a component 256a-256c may include a custom access element (e.g., OAuth element), a custom footer, a custom header, and/or any other suitable custom element. Insertion of a custom component into a schema 252 overrides the relevant portions of the schema 252 and allows a developer to deviate a project and/or page from the predetermined template of the schema 252.

At step 206, the selected components 256a-256c are customized. In various embodiments, data sources for selected components 256a-256c may be selected. For example, in some embodiments, a selected component 256a-256c may be configured to load and present data from one or more data sources. Components configured to present data may include, but are not limited to, table components, carousel components, image components, etc. A user may be prompted and/or may interact with a component 256a-256c during and/or after insertion of the component 256a-256c into the schema 252 to select specific data sources for the component 256a-256c.

In some embodiments, customization may include defining one or more features of the selected component 256a-256c. For example, in some embodiments, an inserted component may include one or more customizable fields or elements including, but not limited to, a title, headers, footers, column and/or row labels, etc. The customization may be performed through editing code and/or through a front-end editor allowing direct editing of the component as implemented in the schema 252.

In some embodiments, the components 256a-256c are predefined to conform to a decoding protocol. For example, in some embodiments, the decoding protocol is JSON decoding protocol and each of the components 256a-256c includes a JSON having a predetermined format configured to be processed by a decoding protocol, as discussed in greater detail herein. Although embodiments are discussed herein including a JSON decoding protocol and JSON-defined (or "wrapped") components 256a-256c, it will be appreciated that any suitable language may be used to define portions of the components 256a-256c and the decoding protocol may be configured to decode one or more of the selected languages.

It will further be appreciated that the backend portion of a component 256a-256c may be defined in any suitable code language which may or may not include the code language used for the frontend portion of the component 256a-256c. For example, in various embodiments, the backend portion of the component 256a-256c may be defined in Java, JavaScript, C, C++, python, Ruby, and/or any other suitable code language.

At step 208, a data request is performed to obtain the data identified for the component 256a-256c from a predetermined source. For example, in some embodiments, a data source network address (such as a web address, internet protocol address, internal network address, etc.) may be provided during the customization step at 206. The provided network address identifies a source, such as an API, configured to provide data necessary for filling the selected component 256a-256c. In some embodiments, the data source request includes a backend API call implementation 264 configured to receive the data source network address and obtain the identified data.

At step 210, the components 256a-256c, including the data received from the data request at step 208, is provided to a decoder 258, such as, for example, a React decoding instance 258. The decoding instance may implement the same decoding protocol used at step 208 and/or may be a separate decoding instance implementing a separate decoding protocol. The decoding instance 258 implements the backend code defining the component 256a-256c based on the data received from the data request at step 210. For example, in some embodiments, the decoding instance 258 is configured to populate a table with data obtained from the data request at step 210. In other example embodiments, the decoding instance 258 may be configured to populate a component with images, text, and/or other data obtained from the data source at step 210.

In some embodiments, decoding of the components 256a-256c includes linking, or binding, relationships between various defined components 256a-256c, predefined elements of the schema 252, and/or associated data sources. By handling the linking of elements as part of the decoding processing, the disclosed method 200 provides for a clear separation between the logic layers and the user interface layers and allows reusable modules at the node module level. In some embodiments, mapping may be facilitated through one or more application programming interfaces (APIs) configured to integrate, stitch, display and/or otherwise implement the a portion of the component.

The decoder 258 generates a completed project (or page) 270 including the selected components 256a-256c. The selected components 256a-256c are populated with the data provided by the component data source 266. Additional pages in the same or different projects may be generated using the same components 256a-256c but with different data sources to generate different pages. Similarly, other pages may be generated using some or none of the components 256a-256c but instead using other NPM components stored in the component library.

Figure 5:
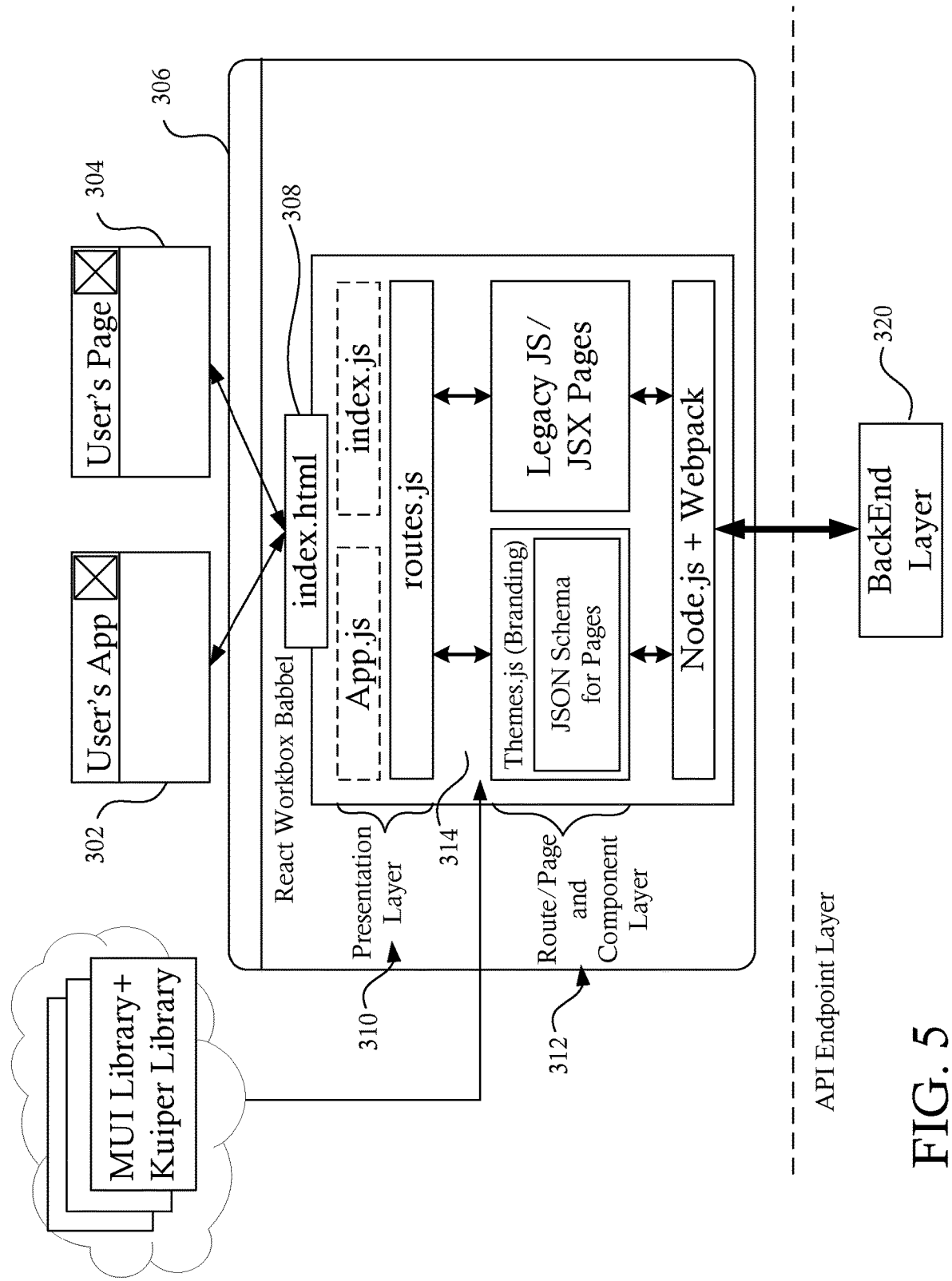
FIG. 5 is a process flow illustrating a node package manager (NPM) componentized user interface workflow, in accordance with some embodiments.

FIG. 5 is a process flow illustrating a node package manager (NPM) componentized user interface workflow 300, in accordance with some embodiments. As illustrated in FIG. 5, a user operating an application 302 or a page 304 (such as a webpage) interacts with a frontend layer 306 provided by one or more systems. The frontend layer 306 may be provided by, for example, a component repository system 24, a web server (not shown), and/or any other suitable system.

The frontend layer 306 includes an interface 308 configured to provide access to the presentation layer 310 and the route/page and component layer 312. In some embodiments, the interface can include an html page provided by a server, although it will be appreciated that any suitable interface 308 may be provided. The presentation layer 310 includes various elements shared across all pages in a project, for example, various JavaScript elements. The presentation layer 310 is in communication with the underlying route/page and component layer 312.

In the illustrated embodiments, the route/page and component layer 312 includes a NPM componentization block 314 and a legacy block 316. The NPM componentization block 314 is configured to present pages/projects generated using the method 200 discussed above in conjunction with FIGS. 3-4. For example, in the illustrated embodiment, the NPM componentization block 314 includes schemas 252a for various pages in the project and is in communication with the component library 254a in order to load components 256a-256c previously added to a schema 252a, in accordance with the method 200 discussed above. The traditional page/project development process 316 allows legacy pages to be loaded within the project alongside the NPM componentization-generated pages.

The NPM componentization block 314 and the legacy block 316 are each in communication with a backend layer 320. With respect to the NPM componentization block 314, the backend layer 320 may provide underlying code for one or more components inserted into a schema 252a and/or may provide data sources for one or more components included in the schema 252a. In some embodiments, the backend layer 320 includes an API endpoint layer.

In one example embodiment, the disclosed systems and methods may be applied to generate a user interface structure from one or more well-defined object literals (e.g., components). The user interface structure may be defined in one or more modular steps. The modular steps may be executed in incremental fashion. In some embodiments, the modular steps may include, but are not limited to: defining and/or selecting simple components (e.g., simple React components) such as buttons, text fields, drop-downs, etc.; defining and/or selecting crucial components (e.g., crucial React components), such as tables, charts, grids, etc.; defining and/or selecting custom components such as authorization elements (e.g., OAuth), footer, header, etc.; defining and/or selecting user interface theming templates such as implementation of defined user interface themes (manually and/or automatically); defining and/or implementing testing templates to define unit testing and integration testing; defining and/or implementing application templates, for example, applications built from user interface schemas; and/or any other similar modular steps.

In some embodiments, the disclosed systems and methods provide an easily adaptable model that reduces (e.g., eliminates or substantially eliminates) the learning curve and provides reusability of components and interface elements. The disclosed systems and methods further provide a reduction in development time and costs for generating updated and/or new pages, applications, or other interface elements. A unified user interface experience can be generated by implementing reusable components across multiple projects and pages. Such unified user interface reduces time spent on interface management and provides a better, unified user experience.

In one example embodiment, generation of a user interface using the disclosed systems and methods was compared to generation of a user interface using traditional methods.

The disclosed systems and methods provided reduced the time required for user experience design, user interface design, and frontend development for one page was reduced from about 4 weeks to about 2 weeks, cutting the time for development and deployment in half. Other benefits and advantages of the disclosed systems and methods will be recognized by those of skill in the art.

Although the subject matter has been described in terms of claims should be construed broadly, to include other variants and embodiments, which may be made by those skilled in the art.

What is claimed is:

1. A system, comprising:
a non-transitory memory having instructions stored thereon and a processor configured to read the instructions to:
load a schema from a repository, wherein the schema defines one or more containers configured to receive a component therein;
select at least one component for insertion into a first container defined by the schema, wherein the at least one component includes a frontend portion and a backend portion, wherein the frontend portion is configured to receive at least one customization of the at least one component and the backend portion is accessible through an application programming interface defining an underlying shared code for the at least one component;
define the at least one customization of the at least one component; and
implement the at least one component using a predetermined decoding process,
wherein the at least one component is preconfigured for deployment to a limited set of schema from the repository, and
wherein the at least one component is a computer-implemented program.

2. The system of claim 1, wherein the at least one component is stored in an edge-side streaming library.

3. The system of claim 1, wherein the schema defines at least one theme element, and wherein the at least one component is customized during the predetermined decoding process based on the theme element.

4. The system of claim 1, wherein the at least one customization of the component includes a data source identifier.

5. The system of claim 4, wherein the data source identifier comprises an application programming interface call.

6. The system of claim 1, wherein the frontend portion of the at least one component comprises a JSON.

7. The system of claim 1, wherein the at least one component comprises a customized component configured to overwrite one or more elements of the schema.

8. A non-transitory computer readable medium having instructions stored thereon, wherein the instructions, when executed by a processor cause a device to perform operations comprising:
loading a schema from a repository, wherein the schema defines one or more containers configured to receive a component therein;
selecting at least one component for insertion into a first container defined by the schema, wherein the at least one component includes a frontend portion and a backend portion, wherein the frontend portion is configured to receive at least one customization of the at least one component and the backend portion is accessible through an application programming interface defining an underlying shared code for the at least one component;
defining the at least one customization of the at least one component; and
implementing the at least one component using a predetermined decoding process,
wherein the at least one component is preconfigured for deployment to a limited set of schema from the repository, and
wherein the at least one component is a computer-implemented program.

9. The non-transitory computer readable medium of claim 8, wherein the at least one component is stored in an edge-side streaming library.

10. The non-transitory computer readable medium of claim 8, wherein the schema defines at least one theme element, and wherein the at least one component is customized during the predetermined decoding process based on the theme element.

11. The non-transitory computer readable medium of claim 8, wherein the at least one customization of the component includes a data source identifier.

12. The non-transitory computer readable medium of claim 11, wherein the data source identifier comprises an application programming interface call.

13. The non-transitory computer readable medium of claim 8, wherein the frontend portion of the at least one component comprises a JSON.

14. The non-transitory computer readable medium of claim 8, wherein the at least one component comprises a customized component configured to overwrite one or more elements of the schema.

15. A method, comprising:
loading a schema from a repository, wherein the schema defines one or more containers configured to receive a component therein;
selecting at least one component for insertion into a first container defined by the schema, wherein the at least one component includes a frontend portion and a backend portion, wherein the frontend portion is configured to receive at least one customization of the at least one component and the backend portion is accessible through an application programming interface defining an underlying shared code for the at least one component;
defining the at least one customization of the at least one component; and
implementing the at least one component using a predetermined decoding process,
wherein the at least one component is preconfigured for deployment to a limited set of schema from the repository, and
wherein the at least one component is a computer-implemented program.

16. The method of claim 15, wherein the at least one component is stored in an edge-side streaming library.

17. The method of claim 15, wherein the schema defines at least one theme element, and wherein the at least one component is customized during the predetermined decoding process based on the theme element.

18. The method of claim 15, wherein the at least one customization of the component includes a data source identifier, and wherein the data source identifier comprises an application programming interface call.

19. The method of claim 15, wherein the frontend portion of the at least one component comprises a JSON.

20. The method of claim 15, wherein the at least one component comprises a customized component configured to overwrite one or more elements of the schema.

\* \* \* \* \*